(12) United States Patent
Schiele et al.

(10) Patent No.: US 8,088,040 B2
(45) Date of Patent: Jan. 3, 2012

(54) PROCESS FOR ACTUATING A TRANSMISSION MECHANISM

(75) Inventors: Peter Schiele, Kressbronn (DE); Klaus Steinhauser, Kressbronn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 725 days.

(21) Appl. No.: 12/115,608

(22) Filed: May 6, 2008

(65) Prior Publication Data

US 2008/0293544 A1 Nov. 27, 2008

(30) Foreign Application Priority Data

May 23, 2007 (DE) .......................... 10 2007 023 956

(51) Int. Cl.
*F16H 61/26* (2006.01)
(52) U.S. Cl. ........................................ 477/156; 477/138
(58) Field of Classification Search .................. 477/156, 477/159, 164, 115, 130, 138
See application file for complete search history.

(56) References Cited

U.S. PATENT DOCUMENTS

| | | | |
|---|---|---|---|
| 5,676,620 A * | 10/1997 | Ulm et al. ..................... 477/115 |
| 5,967,941 A | 10/1999 | Nishina et al. |
| 6,390,947 B1 | 5/2002 | Aoki et al. |
| 7,150,333 B2 | 12/2006 | Noda et al. |
| 7,702,444 B2 * | 4/2010 | Schiele ........................... 701/53 |
| 7,704,188 B2 * | 4/2010 | Schiele et al. ................ 477/115 |

FOREIGN PATENT DOCUMENTS

| | | |
|---|---|---|
| DE | 10 2005 001 563 A1 | 7/2006 |
| DE | 10 2006 014 756 A1 | 10/2007 |
| EP | 0 992 714 A | 4/2000 |
| EP | 1 069 346 A2 | 1/2001 |
| FR | 2 802 866 A | 6/2001 |

\* cited by examiner

*Primary Examiner* — Justin Holmes
(74) *Attorney, Agent, or Firm* — Davis & Bujold, P.L.L.C.

(57) ABSTRACT

A process for actuating a transmission mechanism having hydraulic shifting elements for changing gear ratios by using electric actuators to adjust the actuating pressures of the shifting elements. Upon a request from an engine start/stop function for shutdown of an engine, the flow of electrical current to the actuators is changed from an operating level to a standby level depending upon the operating pressure of the shifting elements. Upon the request for startup of the engine, the flow or electrical current is changed from the standby level to the operating level. A system pressure in the hydraulic system is zero when the engine is shutdown, and the power consumption in the transmission mechanism is lower at the standby level than the operating level.

10 Claims, 2 Drawing Sheets

PROCESS FOR ACTUATING A TRANSMISSION MECHANISM

This application claims priority from German Application Serial No. 10 2007 023 956.6 filed May 23, 2007.

FIELD OF THE INVENTION

The invention concerns a process for actuating a transmission mechanism having several shifting elements that can be acted on with hydraulic fluid from a pressure source.

BACKGROUND OF THE INVENTION

Engine start/stop functions are used for reducing fuel consumption, as well as for reducing pollutant emissions of motor vehicles, configured with internal combustion engines and known from the practice. By way of these functions, internal combustion engines are shutdown with the aid of different vehicle concepts in appropriate operating states of the vehicle, wherein these functions are activated or de-activated, depending on the operating states of the various vehicle components, and the internal combustion engine of the vehicle is even shutdown during short vehicle standstills. Moreover, the internal combustion engines are again started up and/or shutdown when predefined startup criteria are present.

In order to prevent impairment of a conventional driving operation, due to an engine start/stop function, a quick startup process of the internal combustion engine and immediate buildup of power flow is necessary in the transmission mechanism of a vehicle when the driver of the vehicle requests to continue driving, especially when driving into heavy traffic and right-of-way roads. In conventionally designed automatic transmission mechanisms or automated manual transmissions, which are configured with shifting elements designed as wet-running disk clutches or disk brakes for engaging or disengaging different transmission steps of the transmission mechanism. The shifting elements are essentially supplied with the required actuating pressure, via a main transmission pump, only when the internal combustion engine is running. In this process, the startup pressure and/or actuating pressure of a shifting element are respectively adjusted, via at least one electric actuator.

From DE 10 2006 014 756.1, an apparatus is known which stores hydraulic fluid of a hydraulic system of a transmission mechanism, as well as a process for operating such an apparatus, in order to operate a vehicle running with an engine start/stop function with a desired spontaneity. The apparatus and/or hydraulic storage device is designed as a spring-loaded oil reservoir with an electromechanical detent mechanism.

The hydraulic storage device is filled by way of hydraulic pressure generated by a main transmission pump while the internal combustion engine is running, wherein a piston of the hydraulic storage device is positioned and maintained in position by a holding device as the filling level increases. When the internal combustion engine is shutdown and the drive of the main transmission pump is at zero, the hydraulic pressure in the hydraulic system of the transmission mechanism essentially decreases to zero. If there is a request from the engine start/stop function for starting of the internal combustion engine, the generation of power flow in the transmission mechanism is easily supported during the process of starting the internal combustion engine by forcing out the hydraulic fluid stored in the hydraulic storage device.

Furthermore, when the hydraulic system of the transmission mechanism reaches a depressurized state as a result of the shutdown of the internal combustion engine, the flow of electrical current to the electric actuators is set at a standby level, at which merely diagnostic functions may be performed via the actuators in the transmission mechanism and at which a rated input power of the transmission mechanism is minimized in order to considerably reduce the load on the electrical system of the vehicle. Moreover, the flow of electrical current to the actuators is changed upon a request from the engine start/stop function for starting the internal combustion engine and/or when starting the internal combustion engine is detected by the standby level, to an operating level, at which the actuators may each be energized to a required current value that is equivalent to the required operating state, such as engaging a gear ratio, a neutral state or a parking state. By changing the flow of electrical current to the actuators from the standby level to the operating level, the shifting elements being engaged to produce the desired operating state of the transmission mechanism are simultaneously acted on by the hydraulic system of the transmission mechanism and filled with hydraulic fluid.

However, it is disadvantageous in this process that additional actuating routines for feeding current to the actuators need to be provided for a minimum flow of electrical current to the actuators of a transmission mechanism in order to still be able to energize the actuators in this operating state of the transmission mechanism with at least the current values required for diagnostic functions.

From EP 1 069 346 B1, it is known to minimize the power load of the on-board electrical system of the vehicle when the internal combustion engine is shutdown by feeding current to the actuators of the transmission mechanism at a lower level than when the internal combustion engine is running.

With this known solution, it is disadvantageous that separate actuating sequences must be provided for implementing the operating mode of the transmission mechanism with a lower power requirement in addition to the actuating sequences for the flow of electrical current to the actuators during normal driving. These separate actuating sequences have, however, a complex design to ensure the required functionality and, therefore, require a corresponding storage space and also extend the actuation times of a transmission mechanism to an undesirable extent due to long calculating times.

Furthermore, as a result of the proposed separate flow of electrical current to the actuators when the internal combustion engine is shutdown, the shifting elements of the transmission mechanism have transmission capacities which, under certain circumstances, may lead to a locking of the drive output shaft of a vehicle and the output connected thereto when there is a system pressure in the hydraulic system that corresponds to the normal operation of the transmission mechanism. In order to prevent the function for implementing the minimum flow of electrical current to the actuators from being selected during normal driving, further security measures have to be provided which, however, entail additional efforts that further increase the manufacturing costs of a transmission mechanism.

It is therefore the object of the invention to provide a process for actuating a transmission mechanism with several shifting elements that can be acted on by a pressure source with hydraulic fluid such that the power required by a transmission mechanism can be reduced, when the internal combustion engine is shutdown, without additional efforts that could cause an increase of the manufacturing costs of the transmission mechanism in comparison with conventionally operated transmission mechanisms.

SUMMARY OF THE INVENTION

In the process for actuating a transmission mechanism, according to the invention, having several shifting elements that can be acted on by a pressure source with hydraulic fluid in order to engage or disengage different transmission steps and having several electrical actuators of a hydraulic system of the transmission mechanism for adjusting the actuating pressures of the shifting elements, the flow of electrical current to the actuators is adjusted from an operating level, at which the actuators are each energized with a current value equivalent to an actuating pressure subject to the operating state of the shift elements, to a standby level, upon a request in an engine start/stop function for a shutting down an internal combustion engine of a drive train having a transmission mechanism. When the engine start/stop function requires starting the internal combustion engine, the flow of electrical current to the actuators is adjusted from the standby level to the operating level, where the system pressure in the hydraulic system is essentially zero when the internal combustion engine is shutdown, and a power consumption in the transmission mechanism while current is fed to the actuators at the standby level is lower than at the operating level.

The standby level, which is selected when there is a requirement for a shutdown of the internal combustion engine for feeding current to the actuators, corresponds to an operating level provided for the implementation of the gear transmission ratio of the transmission mechanism.

The power requirement of the transmission mechanism is thus easily reduced in comparison with conventionally operated transmission mechanisms without additional effort at least when the internal combustion engine is shutdown. In this case, it is especially advantageous that the minimum flow of electrical current to the actuators, known from prior art, is prevented from being carried out in the area of the transmission mechanism, which can only be implemented via additional actuation routines.

In contrast to a minimum power supply, the actuators are already set to an operating state before, the automatic shutdown of the internal combustion engine or only when the internal combustion engine is shutdown, by way of the method, according to the invention, when a requirement for shutting down the internal combustion is present in which operating state a change in the gear transmission ratio and/or transmission step of the transmission mechanism is triggered when there is adequate system pressure in the hydraulic system, that is, from an initial gear ratio, which is shifted prior to changing the flow of electrical current to the actuators in the transmission mechanism, to a defined target gear, which based on the gear logics and/or actuator logics consumes less power from the transmission mechanism.

The solution makes use of the realization that an internal combustion engine is usually shutdown close to a standstill of the vehicle or during a standstill of the vehicle, wherein a startup gear transmission ratio is then mostly adjusted in the transmission mechanism. In this connection, the electric actuators required for implementing a startup gear transmission ratio in the transmission mechanism are frequently energized with higher current values than for the implementation of a higher transmission step. This procedure results from safety requirements, such that the engagement of an excessively low transmission step in the transmission mechanism should be prevented when the flow of electrical current decreases. In this way, undesirable and unsafe locking of the drive wheels at high vehicle speeds should be especially safely prevented.

For this reason, an advantageous embodiment of the process, according to the present invention, provides that by way of the operating level, at which the actuators are still energized at the time the requirement for shutting down the internal combustion engine is made, a startup gear transmission ratio can still be implemented.

In a further advantageous embodiment of the process, an emergency gear, which engages preferably during emergency mechanical operation of the transmission mechanism, can be implemented in the transmission mechanism by way of the standby level at which the actuators are preferably energized no later than when the internal combustion engine is shutdown.

Notwithstanding, it is also possible to energize the actuators with current values at which each actuator is set to an operating state, in which the transmission mechanism is shifted into a neutral state or parking state, wherein the power requirement of the transmission mechanism at the current value level is lower than at the operating level at which the request for shutdown of the internal combustion engine is made. In this case, the current values correspond to those at which the actuators are each energized with the started or stopped internal combustion engine for the implementation of the neutral state or parking state of the transmission mechanism at the operating level as well as at the standby level.

The change in flow of electrical current to the actuators when there is a requirement for a shutdown of the internal combustion engine, at which the transmission mechanism is shifted from the initial transmission ratio to a target gear transmission ratio on the actuator side, is carried out in a further advantageous embodiment of the process, by way of a gearshift process provided during normal driving of the vehicle, where preferably several consecutive gearshifts and/or multiple gearshifts can be realized via the gearshift process.

Thus, when there is a requirement for a shutdown of the internal combustion engine, a transmission mechanism can be conveyed from an operating state, in which the power requirement of the transmission mechanism is high, to a low current operating state by way of available gearshift processes, such as those for single or multiple gearshifts, without significant additional efforts in comparison with existing transmission systems.

If the transmission mechanism is designed with an inverse-proportional actuator for adjusting the system pressure in the hydraulic system and the system pressure adjusted via this actuator increases when the current values for the actuator decrease, the flow of electrical current to the inverse-proportional actuator is reduced to a predefined value in an advantageous embodiment of the process when there is a requirement for a shutdown of the internal combustion engine in order to reduce leakages of the hydraulic system in the area of the inverse-proportional actuator. This results from the fact that actuators of this type are frequently configured as pressure limiting valves, and the system pressure to be currently adjusted in the hydraulic system is adjusted by limiting the feed pressure of the main transmission pump. In this case, it is known to expel any excessive hydraulic fluid in the area of the actuators into a hydraulic fluid reservoir and/or oil sump of the transmission mechanism. The amount of the expelled hydraulic fluid decreases as the current values decrease so that the actuator leakages are easily reduced by way of the last mentioned procedure.

This operating state of the inverse-proportional actuator can be maintained when the internal combustion engine is shutdown and can only be transferred again into a preferred state during normal driving of the vehicle shortly before or during the startup process and/or after startup of the internal combustion engine.

In a further advantageous embodiment of the process, when there is a requirement for shutdown of the internal combustion engine, the activated alternating routine for the reduction of the flow of electrical current level to the actuators from the operating level to the standby level when there is a requirement for startup of the internal combustion engine when the internal combustion engine is in an operating state, in which the internal combustion engine has not yet been shutdown and in which the speed of the internal combustion engine is above a limit speed, below which the speed of the internal combustion engine for starting up the internal combustion engine should be first brought to zero, is de-activated, and the internal combustion engine continues operating. Thus, speeding up of the internal combustion engine is possible in a simple manner if the speed of the internal combustion engine has not yet dropped below the speed required for this purpose.

A further advantageous embodiment of the process is characterized in that the actuators are energized during the change in flow of electrical current from the standby level to the operating level so that an actuating pressure of a non-force locking, shifting element provided for the implementation of the target gear transmission ratio to be adjusted by the operating level or the actuating pressures of several non-force locking, shifting elements provided for the implementation of the target gear transmission ratio, is or are increased to a closing pressure, at which the shifting element or elements at least nearly show their full transmission capacity. The actuating pressure of a force locking, shifting element provided for the implementation of the target gear transmission ratio is subsequently increased in a modulated manner to a closing pressure. Thus the non-force locking, shifting elements for the implementation of the target gear transmission ratio required by the startup process of the internal combustion engine or a non-force locking, shifting element provided for the implementation of just this target gear transmission ratio can be transferred into the required state within short actuating times, where basically no measures have to be provided to support the driving comfort when actuating this shifting element and/or shifting elements.

In this connection, it can be provided that the actuating pressure of the non-force locking, shifting elements are simultaneously or consecutively adjusted to the closing pressure by the corresponding flow of electrical current to the assigned actuators, and that the actuating pressure of the force locking, shifting element is subsequently adjusted to the closing pressure level.

As an alternative, it is also possible to energize the actuators during the change in flow of electrical current from the standby level to the operating level so that the actuating pressure of at least one shifting element is adjusted to the closing pressure level. The actuating pressure is subsequently at least nearly simultaneously preferably adjusted in a modulated manner to the closing pressure level by at least another non-force locking, shifting element and one force locking, shifting element.

Measures of this type should merely be considered in these procedures during actuation of the force locking, shifting element to be engaged for the implementation of the target gear transmission ratio required by the startup process of the internal combustion engine. The force locking, shifting element should only be transferred into the provided operating state for the implementation of the required target gear transmission ratio after a non-force locking, shifting element or after the non-force locking, shifting elements.

A further advantageous embodiment of the process provides that when there is a requirement for startup of the internal combustion engine, the provided change in flow of electrical current to the actuators, at which the transmission mechanism is transferred from the initial gear transmission ratio into a target gear transmission ratio on the actuator side, is carried out by way of a gearshift process provided during driving of the vehicle, where preferably several consecutive gearshifts can be realized by way of the gearshift process. Thus, the transmission mechanism can be transferred from the operating state in which the power requirement of the transmission mechanism is reduced, into the operating state provided for driving the vehicle without significant additional effort in comparison with existent transmission systems. This is also possible in the above-mentioned embodiment of the process when there are several transmission steps and/or gear ratios when changing from the low current operating state of the transmission mechanism to the operating state to be set as required for startup. The change, between the initial gear transmission ratio and target gear transmission ratio, is likewise realized during normal driving of the vehicle by way of multiple upshifts or downshift.

In order to reduce the load on the on-board electrical system of the vehicle that supplies the actuators with electric power in a simple manner during the change in flow of electrical current to the actuators when changing from operating level to standby level or from standby level to operating level, the change in flow of electrical current in the area of the different actuators is not carried out simultaneously but consecutively and/or one after another.

BRIEF DESCRIPTION OF THE DRAWINGS

The invention will now be described, by way of example, with reference to the accompanying drawings in which.

DETAILED DESCRIPTION OF THE INVENTION

Figure 1:
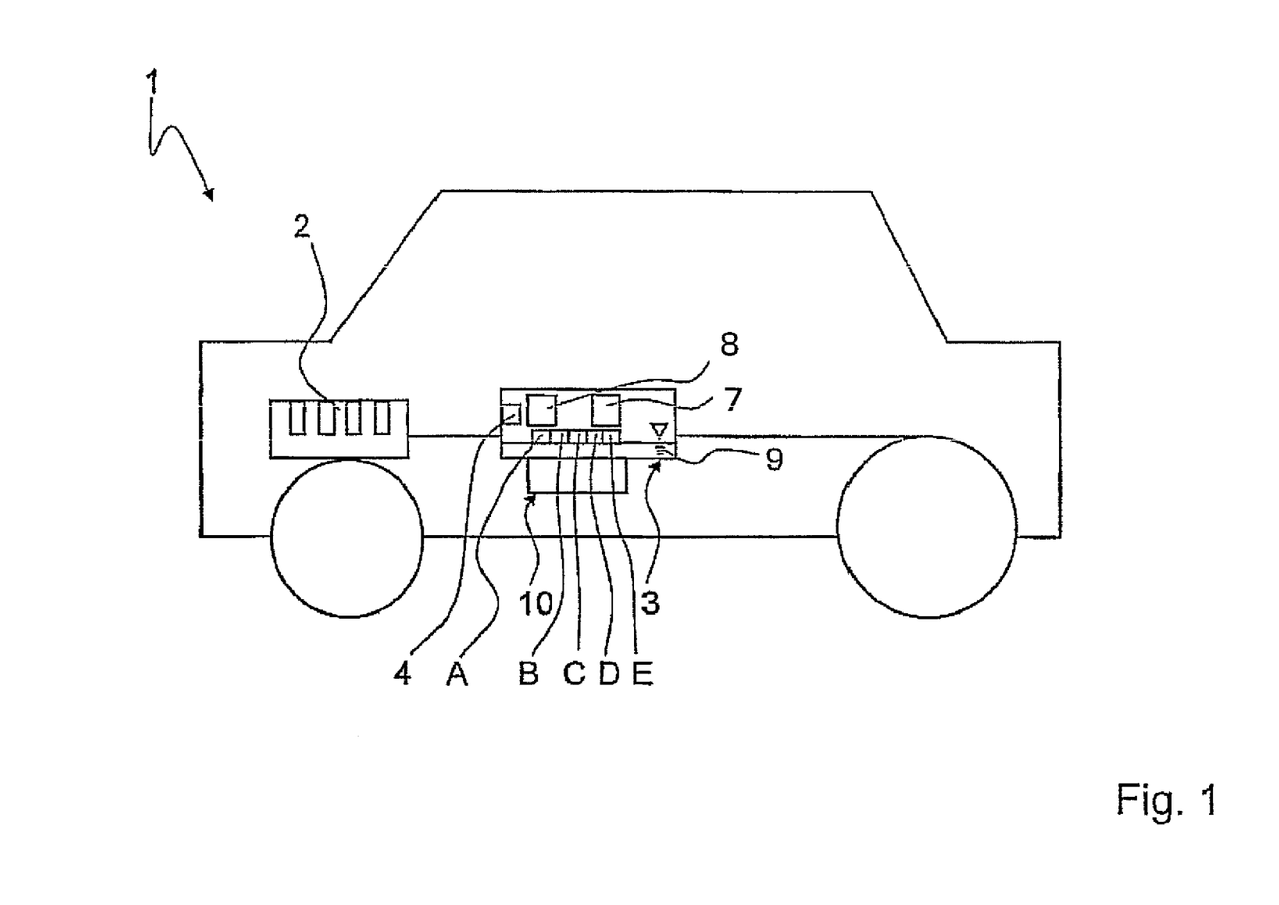
FIG. 1 shows a schematized representation of a vehicle with a drive train having a transmission mechanism and an internal combustion engine.

FIG. 1 shows a vehicle 1 having an internal combustion engine 2 and a transmission mechanism 3 with several shifting elements A to E that can be acted on by a pressure source 4 with hydraulic pressure in order to engage and disengage different transmission steps and with several electric actuators 7, 8 of a hydraulic system of the transmission mechanism 3 for adjusting actuating pressures for the shifting elements A to E.

The transmission mechanism 3 may basically be any automated manual transmission or automatic transmission, such as a double-clutch transmission, a CVT (Continuously variable transmission), variable automatic transmission, etc., known from practice, which is configured with hydraulically activated shifting elements A to E with friction-locked, disk clutches or disk brakes.

An engine start/stop function is provided in order to optimize the consumption and reduce the emission of pollutants of the vehicle 1, by shutting down the internal combustion engine 2 within predefined operating states of the vehicle 1 and again started up when one or more startup criteria are present.

Thus, the internal combustion engine 2 is shutdown when the brake light is activated, the brake pedal is activated or the operating brake is otherwise activated and with standstill of the vehicle and/or when the clutch pedal is actuated by the driver, for example, even during very short standstill phases of the vehicle when the gear selector lever is in the "D" position for forward driving, and is again started up when different startup criteria are present, for example, such as when brake pressure falls below a threshold, the vehicle brake is released, the brake light is de-activated, when the driver actuates the gear selector lever in a position in which startup of the internal combustion engine 2 is required, when the accelerator is activated at a higher or lower value than a threshold value, when the servo mechanism indicates a startup process of the internal combustion engine, in the presence of an output speed that is higher or lower than a threshold value, when there is a predefined power balance of an electric accumulator of the vehicle or, depending on comfort criteria, like a request for air conditioning in the passenger cabin.

In this case, the transmission mechanism 3 is configured in addition with a hydraulic system (not depicted in more detail in the drawing), an oil sump 9 and a hydraulic storage device 10 for the storage of the hydraulic fluid of the hydraulic system of the transmission mechanism 3.

The hydraulic storage device 10, allocated to the transmission mechanism 3, corresponds to a device for storing hydraulic fluid of a hydraulic system of a transmission mechanism described in DE 10 2006 014 756.1, and is operated according to the process likewise proposed therein.

When the engine start/stop function requests a shutdown of the internal combustion engine 2 from a standby level, at which the actuators 7 and 8 are each energized with a current value equivalent to the actuating pressure of the shifting elements A to E that is subject to the operating state, the flow of electrical current to the actuators 7 and 8 is set to a standby level, whereupon the flow of electrical current to the actuators 7 and 8 is, in turn, set from the standby level to the operating level when there is a request by the engine start/stop function for startup of the internal combustion engine 2.

If the vehicle 1, configured with the transmission mechanism 3, is close to a standstill, and the internal combustion engine 2 is operated at an engine speed that essentially corresponds to an idling speed, the internal combustion engine 2 is shutdown by the engine start/stop function and the engine speed essentially decreases from the idling speed to zero.

The request for a shutdown of the internal combustion engine by the engine start/stop function temporally precedes the shutdown point of the internal combustion engine 2 and, in addition, preferably causes the hydraulic storage device 10, allocated to the transmission mechanism 3, to be completely filled prior to the shutdown point of the internal combustion engine 2 and to be located in position and to be held in its completely filled state by a holding device.

In this way, the hydraulic fluid volume, stored in the hydraulic storage device 10, is even stored when a shutdown of the internal combustion engine 2 occurs, since the pressure source 4 and/or main transmission pump of the transmission mechanism 3 driven by the internal combustion engine 2 discontinues feeding, and the system pressure in the hydraulic system of the transmission mechanism decreases to zero.

Prior to the change in flow of electrical current from the operating level to the standby level, the actuators 7 and 8 are energized with current values in such a way that a startup gear transmission ratio is engaged in the transmission mechanism 3 with a correspondingly feeding main transmission pump 4 and the gear selector level in position D.

Depending on the respective application, the operating level is lowered to the standby level at the moment the request for shutdown of the internal combustion engine 2 is made, subsequent to the moment of the request, at the moment of shutdown or only after the shutdown point of the internal combustion engine 2, wherein the operating level selected for the flow of electrical current to the actuators 7 and 8 when the internal combustion engine is shutdown corresponds to an operating level provided for the implementation of a higher transmission step. The operating level of the higher transmission step is characterized by a lower power requirement of the transmission engine 3 so that the power requirement of the transmission engine 3 is reduced by the change from the operating level to the standby level. In this case, the higher gear transmission ratio engaged on the actuator side corresponds to an emergency gear within the range of a gear transmission ratio of the transmission mechanism, to which is also allocated the startup gear ratio.

Notwithstanding, it is also possible that the gear transmission ratio engaged on the actuator side in the transmission mechanism 3 is different from the emergency gear. The selected gear transmission ratio and/or its corresponding flow of electrical current to the actuators is basically characterized in that its power requirement is lower than the flow of electrical current to the actuators needed for the implementation of the engaged startup gear transmission ratio when the request for shutdown of the internal combustion engine in the transmission mechanism 3 is made. In this way, it is ensured that the startup gear transmission ratio is definitely not automatically engaged in the transmission mechanism on failure of the on-board electrical system of the vehicle, which may perfectly well occur even at high vehicle speeds.

The transmission mechanism 3 is designed as an eight-gear automatic transmission in this case and the startup gear transmission ratio corresponds to the first forward drive position. Depending on the accomplishment of the transmission mechanism, the emergency gear corresponds to a fourth or sixth forward drive position so that when the flow of electrical current to the actuators of the transmission mechanism 3 changes, either the second and third transmission step or the second to fifth transmission step should be skipped on the actuator side for driving forward.

In order to achieve the highest possible cost savings potential, when there is a request for shutdown of the internal combustion engine 2, the flow of electrical current to the actuators is changed in such a way that the actuators provided for the implementation of the sixth transmission step are immediately energized with the current values provided for the implementation of the sixth forward drive position, and the actuators provided for the implementation of the first transmission step and/or startup gear transmission ratio are no longer energized or are energized with current values, which are required for carrying out potential diagnostic functions.

In case the gearshift processes required for an immediate change from the flow of electrical current equivalent to the first transmission step to the equivalent flow of electrical current for the fourth or sixth transmission step are not provided, but only multiple gearshift processes, according to which the transmission steps two and three or two to five arranged and/or provided between the first and fourth and/or the first and sixth transmission steps can also be started up, the change in the flow of electrical current will be carried out by way of the multiple gearshift processes. In this case, the flow of electrical current to the actuators is first set from the current values that implement the first transmission step to the current values that implement the second and third transmission steps, before the current values reach the level of the fourth transmission step. If the target gear corresponds to the sixth transmission step, the current values are each set one after another to the values required for the implementation of the first, second, third, fourth and fifth transmission step, and only subsequently to the values provided for the implementation of the sixth transmission step.

In addition, the hydraulic system is configured with an inverse-proportional actuator (not shown in more detail in the drawing) for the adjustment of the system pressure in the hydraulic system. In order to increase the system pressure in the hydraulic system prior to or during gearshift on the actuator side, the flow of electrical current to the inverse-proportional actuator is reduced, since the system pressure increases for the actuator with decreasing current values. At the same time, the portion of the hydraulic fluid volume expelled on the actuator side into the oil sump 9 of the transmission mechanism 3 decreases with decreasing current values, as a result of which so-called actuator leakages in the area of the inverse-proportional actuators, which have a negative impact on the entire level of efficiency of the transmission mechanism, are reduced in a simple manner.

The last-mentioned state of the inverse-proportional actuator is preserved during the entire shutdown phase of the internal combustion engine 2 and, depending on the respective application, only changed again prior to, during or after starting the internal combustion engine toward the normal function of the inverse-proportional actuator, according to which the actuator is operated during normal driving.

If a signal to shutdown the internal combustion engine 2 is followed by a request for startup and/or for a continuation of the actuation of the internal combustion engine 2 triggered by the driver when the accelerator pedal is actuated, the gearshift on the actuator side into the target gear, by way of which the power requirement of the transmission mechanism 3 should be reduced, is discontinued if it has not yet been concluded. At the same time, the transmission mechanism is transferred into a desired operating state by the request to operate the internal combustion engine 2 by correspondingly supplying the actuators with current where, apart from corresponding to a gear transmission ratio, this operating state can also correspond to a neutral state or parking state of the transmission mechanism 3.

Figure 2:
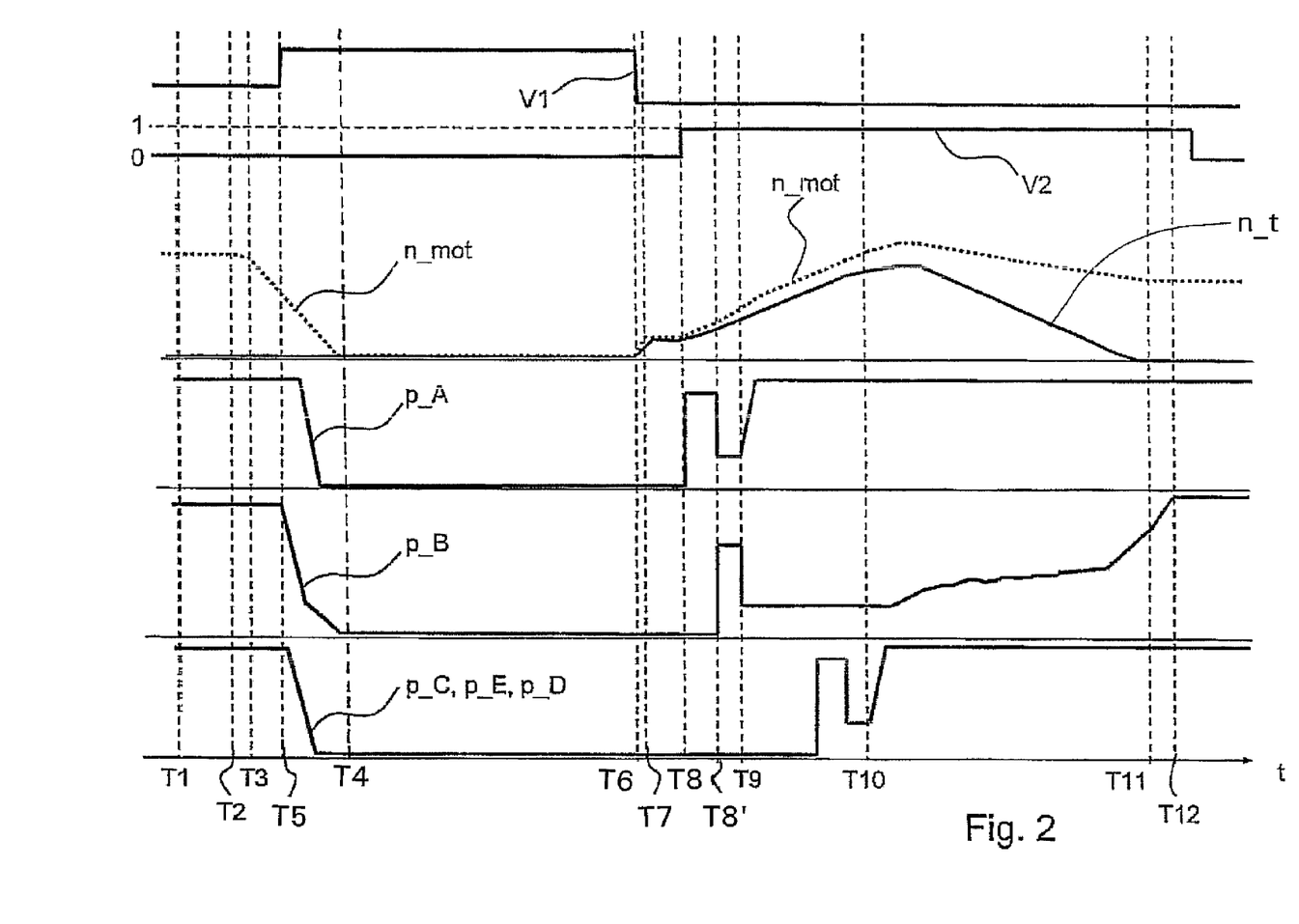
FIG. 2 shows several chronological sequences of different operating state parameters of the vehicle transmission mechanism according to FIG. 1.

FIG. 2 shows several sequences of different operating state parameters of the vehicle transmission mechanism 3 according to FIG. 1, over a period of time t, wherein a first sequence V1 represents the operating state of the transmission mechanism 3 and/or the gear transmission ratio currently engaged in the transmission mechanism 3. A sequence of the engine speed n_mot, as well as a sequence of the turbine speed n_t, are shown below the sequence V1. Several sequences of actuating pressures p_A, p_B, p_C, p_D and p_E of the shifting elements A to E of the transmission mechanism 3 for engaging a first transmission step, a second transmission step or a reverse gear in the transmission mechanism 3, are shown, in turn, under the sequence of the engine speed n_mot and the sequence of the turbine speed n_t. In this connection, the sequence p_A is provided for the actuation of the shifting element A and the sequence p_B is provided for the actuation of the shifting element B. The bottom sequence corresponds to the actuating sequences p_C, p_E or p_D for the actuation of the shifting elements C, E or D in the transmission mechanism 3, where the shifting element C should be actuated in addition to the shifting element A and shifting element B for the implementation of the first transmission step; the shifting element E should be actuated in addition to the shifting elements A and B for the implementation of the second transmission step, and the shifting element D should be actuated in addition to the shifting elements A and B for the implementation of the reverse gear in the transmission mechanism 3.

At a time point T1, the engine start/stop function requests shutdown of the internal combustion engine 2 whereupon, according to the sequence V1, the second transmission step is engaged in the transmission mechanism 3 at the time point T1. The engine speed n_mot is at idle speed level and the turbine speed n_t is equal to zero because the vehicle is at standstill. The actuating pressures p_A, p_B and p_E correspond to the closing pressure of the shifting elements A, B and E, respectively, at which each shifting element A, B and E shows its full transmission capacity. At a time point T2, the engine speed n_mot decreases owing to a corresponding engine control and drops off to zero after a time point T3 with a sharper gradient to time point T4.

At a time point T5, which is situated chronologically between time points T3 and T4, the flow of electrical current to the actuators of the transmission mechanism 3 that actuates the shifting elements A, B and E is changed in such a way that they are energized with current values with which the sixth transmission step is engaged in the transmission mechanism 3 when the internal combustion engine 2 is shutdown. Thus, a sixth transmission step which, in the exemplary embodiment of the transmission mechanism 3 illustrated in FIG. 2 shows an emergency gear of the transmission mechanism 3, is at least engaged in the transmission mechanism 3 on the actuator side. Moreover, the actuating pressures p_B and p_E of the shifting elements B and E drop off to zero in a ramp-like manner. At time point T4, the actuating pressures p_A, p_B and p_E, as well as the engine speed n_mot, are equal to zero.

In this operating state, the transmission mechanism 3 has a lower power requirement than with an engaged first or second transmission step, because the sixth transmission step is implemented with lower current values for the actuators than the first or second transmission step. The shifting elements A, B and E are completely open as a result of the actuating pressures p_A, p_B and p_E that are reduced to zero. This results from the fact that the flow of electrical current to the actuators that actuate the shifting elements A, B and E is correspondingly reduced and the main transmission pump 4 no longer supplies the hydraulic system of the transmission mechanism 3 with hydraulic fluid when the internal combustion engine 2 is shutdown.

A request for startup of the internal combustion engine 2 is made prior to a time point T6, which characterizes the startup time of a startup process of the internal combustion engine 2. Simultaneously with the startup of the internal combustion engine 2, the flow of electrical current to the actuators of the transmission mechanism 3 is changed in such a way that the first transmission step, the second and/or a higher transmission step or the reverse gear are engaged in the transmission mechanism 3. Which of these gear transmission ratios is engaged in the transmission mechanism 3 depends on the driver's specific requirements. As of time point T6, the engine speed n_mot first increases in the manner shown in FIG. 2 up to a time point T7 and remains at this level up to a time point T8.

At time point T8, a function is started for shifting gear from the emergency gear previously engaged in the transmission mechanism 3 on the actuator side to a target gear transmission ratio in the transmission mechanism 3 required by an engine startup, wherein the startup is shown graphically in FIG. 2, by veering a sequence V2 from zero to one.

Notwithstanding, it can also be provided that an operating state, like a parking state or neutral state, is engaged by the required engine startup in the transmission mechanism 3.

By activating the gearshift routine, the actuating pressure p_A of the shifting element A is increased to a fast filling pressure level and is left at this level up to time point T8, which represents the end of the fast filling phase of the shifting element A. At time point T8', the actuating pressure p_A of the shifting element A is decreased to a filling equalization pressure level and maintained up to a time point T9 which, in turn, represents the end of the filling equalization phase of the shifting element A. As of time point T9, the actuating pressure p_A of the shifting element A is increased to the closing pressure level in a ramp-like manner.

In a further embodiment of the process, decreasing the actuating pressure p_A of the shifting element A to the filling equalization pressure value is omitted and the actuating pressure p_A of the shifting element A is immediately guide to the closing pressure level as of time point T8'.

At time point T8', the actuating pressure p_B of the shifting element B is likewise increased to the filling pressure level and again decreased to the filling equalization pressure level at time point T9 and only modulated and likewise guided to the level of the closing pressures in the manner shown in FIG. 2 at time point T10, at which the actuating pressures p_C, p_E, p_D of the shifting elements C, E or D to be started up for the implementation of the first transmission step, second transmission step or reverse gear correspond to the closing pressure. In this case, the actuating pressure p_B of the shifting element B can also be guided to the closing pressure level as of time point T9 without a filling equalization phase.

In general, notwithstanding the procedure described above, filling the shifting elements A to E can be coordinated depending upon the respective application and the actuating pressures of the non-force locking, shifting elements are either consecutively or simultaneously guided, i.e., the last-mentioned events at time points T7 and T8 are each started at least almost at the same time and possibly concluded simultaneously, and guided to the closing pressure prior to the actuating pressure of the force locking, shifting element. Furthermore, the actuating pressure of at least one non-force locking, shifting element may be guided to the closing pressure level simultaneously with the actuating pressure of the force locking, shifting element, if the actuating pressures of the other non-force locking, shifting elements are each already at the level of the closing pressure.

The shifting element A and the shifting element C, E or D each represent the non-force locking, shifting elements for the first transmission step, second transmission step or reverse gear, while the shifting element B is the force locking, shifting element for the above-mentioned three operating states of the transmission mechanism 3. Therefore, closing the shifting element A and the shifting elements C, E or D has an irrelevant effect on the sequence of the engine speed n_mot and turbine speed n_t. Only closing the force locking, shifting element B will change the sequence of the engine speed n_mot.

The allocation of the shifting elements to the group of non-force locking, shifting elements and to the group of the force locking, shifting elements described above correspondingly varies depending upon the design of the transmission mechanism and/or depending upon the drive train concept of a motor vehicle, into which the respective transmission mechanism is incorporated.

At time point T10, at which the shifting elements A and C, E or D have already been closed, the shifting element B is still actuated with an actuating pressure at filling equalization pressure level so that the transmission capacity of the shifting element B is essentially zero and the active connection, between the internal combustion engine 2 and the vehicle output, is discontinued. For this reason, the engine speed n_mot and turbine speed n_t increase over time point t in the manner shown in FIG. 2. The increase in the actuating pressure p_B of the shifting element B shown after time point T10 causes an increase in the transmission capacity of the shifting element B. An increase in the transmission capacity of the shifting element B causes a decrease in the turbine speed n_t to zero at a time point T11, while the engine speed n_mot is guided to the idle speed level with corresponding activation of the internal combustion engine 2. Subsequently, the actuating pressure p_B is guided to the closing pressure level in a ramp-like manner up to a time point T12, as a result of which the transmission mechanism 3 shows the operating state required for starting up the internal combustion engine 2.

The modulated increase in the actuating pressure p_B of the shifting element B supports the startup process of the internal combustion engine 2 in such a way that the speed n_mot of the internal combustion engine can increase without impediment and is subsequently aligned by the increase in the transmission capacity of the shifting element B. This means that an undesirably high increase in the engine speed n_mot above the idle speed level is prevented by the specific increase in the transmission capacity of the shifting element B. Between time points T5 and T12, the engine speed n_mot is harmoniously guided to the idle speed level within a preferably short startup time, as a result of which a vehicle with a drive train configured with an engine start/stop function can be operated with high spontaneity as well as with high driving comfort.

The pressure increase in the force locking, shifting element B is basically carried out in such a way that a defined engine run-up is established on the basis of the shutdown state of the internal combustion engine or during a shutdown process of the internal combustion engine, on the driver's request for startup, which is made by actuating the accelerator pedal and the force locking, shifting element B is closed in the presence of an engine engaging speed depending upon the driver's load requirement.

By way of the process according to the invention, when a request for shutting down the internal combustion engine is made, the power requirement of the transmission mechanism is reduced by way of a change in flow of electrical current to the actuators of the transmission mechanism. This change corresponds to a change in the current supply, which is also carried out during conventional driving when a gear transmission ratio is changed. Thus, a gearshift in the transmission mechanism is at least implemented on the actuator side, since the system pressure in the hydraulic system is equal to zero when the internal combustion engine is shutdown and the change in flow of electrical current to the actuators has no effect on the operating state of the shifting elements.

The proposed decrease in flow of electrical current to the actuators and the respectively related gearshift in the transmission mechanism on the actuator side, according to the present invention, do not require any or merely simple program expansions of the shift processes and/or control procedures, which are preferably provided in an electric transmission control module, such as the implementation of offset values, since the already available shift processes are used to reduce the power requirement of the transmission mechanism. Only functionalities are to be provided, such as the shift processes required for the reduction of the power requirement are accessed and elaborated.

Moreover, the driving comfort is improved in a simple manner by way of the measure described above when the engine is shutdown by the engaged higher gear because the drive train is not load-free as in the neutral state of the transmission mechanism during shutdown of the internal combustion engine. The improvement results from the fact that the gear transmission ratio engaged in the transmission mechanism, which characterizes the active connection between the internal combustion engine and the output, has a lower gear transmission ratio, and damps the drive train oscillations occurring during the process of shutting down the internal combustion engine more efficiently. As a result of the lower gear transmission ratio of the higher gear engaged in the transmission mechanism, speed fluctuations, which usually occur during engine shutdown processes, are also induced in the drive train to a clearly reduced extent in comparison with a startup gear transmission ratio.

The described process is carried out preferably with nearly stopped transmission output, i.e., close to a standstill of the vehicle, wherein it is also possible to change the flow of electrical current with the vehicle moving depending upon the respective application.

REFERENCE NUMERALS 1 vehicle
2 internal combustion engine
3 transmission mechanism
4 pressure source, main transmission pump
7, 8 actuator
9 oil sump
10 hydraulic storage device
A to E shifting element
n_mot engine speed
n_t turbine speed
p_A sequence of the actuating pressure of the shifting element A
p_B sequence of the actuating pressure of the shifting element B
p_C sequence of the actuating pressure of the shifting element C
p_D sequence of the actuating pressure of the shifting element D
p_E sequence of the actuating pressure of the shifting element E
V1, V2 sequence
t time point
T1 to T12 discrete time point

The invention claimed is:

1. A process for actuating a transmission mechanism (3) having several shifting elements (A to E), which are actuated by hydraulic fluid from a pressure source (4) for one of engaging and disengaging different transmission steps, and several electric actuators (7, 8) of a hydraulic system of the transmission mechanism (3) adjust actuating pressures of the hydraulic fluid for the shifting elements (A to E), the process comprising the steps of:

adjusting a flow of electrical charge to the electric actuators (7, 8) from an initial operating level that is not zero to a standby level when a request is made, by an engine start/stop function, to shut down an internal combustion engine (2) of a drive train comprising the transmission mechanism, the flow of electrical charge at the initial operating level energizes the electric actuators (7, 8) with a current value that equates to an actuating pressure at which the shifting elements (A to E) are actuated in an initial operating state;

adjusting the flow of electrical charge to the electric actuators (7, 8) from the standby level to a subsequent operating level, when a request is made, by the engine start/stop function, to startup the internal combustion engine (2);

adjusting the flow of electrical charge to the electric actuators (7, 8) during normal driving operation of the vehicle (1) such that, on an actuator side, the transmission mechanism (3) is shifted, via a shift process, from a startup gear transmission ratio to a target gear transmission ratio, when a request is made to shutdown the internal combustion engine (2);

providing a system pressure in the hydraulic system being zero when the internal combustion engine (2) is shutdown;

providing the flow of electrical charge in the transmission mechanism to the electric actuators (7, 8) being lower at the standby level than at the initial operating level; and providing the standby level of the current feed to the electric actuators (7, 8), upon a request for the internal combustion engine (2) to shutdown, corresponds to the subsequent operating level provided for implementation of a subsequent transmission step.

2. The method according to claim 1, wherein the startup gear transmission ratio for a vehicle (1) in the transmission mechanism (3) is implementable by way of the initial operating level, at which the electric actuators (7, 8) are energized when the request for shutting down the internal combustion engine (2) is made.

3. The method according to claim 1, wherein an emergency gear in the transmission mechanism (3), which engages upon mechanical failure of the transmission mechanism (3), is engagable with the flow of electrical charge at the standby level, at which the electric actuators (7, 8) are energized when the internal combustion engine (2) is shutdown.

4. The method according to claim 1, further comprising the step of consecutively shifting several gears via the shift process.

5. The method according to claim 1, further comprising the step of providing an inverse-proportional actuator in the hydraulic system for adjusting the system pressure, with which the system pressure increases as the flow of electrical charge to inverse-proportional actuator is reduced upon the request for shutdown of the internal combustion engine (2), and maintained at a predefined value when the internal combustion engine (2) is shutdown.

6. The method according to claim 1, further comprising the step of deactivating an activated alternating routine for reduction of the flow of electrical charge to the electric actuators (7, 8) from the initial operating level to the standby level upon the request for startup of the internal combustion engine (2) when the internal combustion engine (2) is in an operating state in which the internal combustion engine (2) can still be operated, upon the request for shutdown of the internal combustion engine (2), and while the internal combustion engine (2) continues to be operated.

7. The method according to claim 1, further comprising the step of energizing the electric actuators (7, 8) while the flow of electrical charge thereto is adjusted from the standby level to the subsequent operating level, such that either an actuating pressure of a non-force locking, shifting element (A, C, D, E) provided for implementation of a target gear transmission ratio to be adjusted by the subsequent operating level, or the actuating pressures of several non-force locking, shifting elements (A, C, D, E) provided for implementation of the target gear transmission ratio are increased to a closing pressure, at which the non-force locking, shifting elements (A, C, D, E) are nearly at their full transmission capacity, and subsequently the actuating pressure of another shifting element (B), provided for implementation of the target gear transmission ratio is increased to the closing pressure in a modulated manner.

8. The method according to claim 1, further comprising the step of energizing the electric actuators (7, 8) during adjustment of the flow of electrical current from the standby level to the subsequent, operating level, such that at least one non-force locking, shifting element (A, C, D, E) provided for implementation of a target gear transmission ratio to be adjusted by the subsequent operating level is increased at the actuating pressure to a closing pressure, at which the at least one non-force locking, shifting elements (A, C, D, E) are at least substantially at their full transmission capacity, and subsequently the operating pressures of at least a further non-force locking, shifting element (A, C, D, E) and a force locking, shifting element (B) provided for implementation of the target gear transmission ratio are simultaneously increased to the closing pressure in a modulated manner.

9. A process for actuating a transmission mechanism (3) having several shifting elements (A to E), which are actuated by hydraulic fluid from a pressure source (4) for one of engaging and disengaging different transmission steps, and several electric actuators (7, 8) of a hydraulic system of the transmission mechanism (3) adjust actuating pressures of the hydraulic fluid for the shifting elements (A to E), the process comprising the steps of:
  adjusting a flow of electrical charge to the electric actuators (7, 8) from an initial operating level that is not zero to a standby level when a request is made, by an engine start/stop function, to shut down an internal combustion engine (2) of a drive train comprising the transmission mechanism, the flow of electrical charge at the initial operating level energizes the electric actuators (7, 8) with a current value that equates to an actuating pressure at which the shifting elements (A to E) are actuated in an initial operating state;
  adjusting the flow of electrical charge to the electric actuators (7, 8) from the standby level to a subsequent operating level, when a request is made, by the engine start/stop function, to startup the internal combustion engine (2);
  adjusting the flow of electrical charge to the electric actuators (7, 8) during normal driving operation of the vehicle (1) such that, on an actuator side, the transmission mechanism (3) is shifted, via a shift process, from a startup gear transmission ratio to a target gear transmission ratio, when a request is made to shutdown the internal combustion engine (2);
    a system pressure in the hydraulic system being zero when the internal combustion engine (2) is shutdown;
    providing the flow of electrical charge in the transmission mechanism to the electric actuators (7, 8) being lower at the standby level than at the initial operating level;
    providing the standby level of the current feed to the electric actuators (7, 8), when the internal combustion engine (2) is shutdown, corresponds to the subsequent operating level provided for implementation of a transmission step; and
  sequentially carrying out a change in the flow of electrical each of the electric actuators (7, 8) when one of changing from the initial operating level to the standby level and from the standby level to the subsequent operating level.

10. A process of adjusting hydraulic actuating pressures with electrical actuators, the hydraulic actuating pressures being directed to shifting elements (A to E) for one of engaging and disengaging shifting gear ratios of a transmission mechanism (3), the method comprising the steps of:
  when a request for shutting down an engine is made by an engine start/stop function, adjusting a flow of electrical current to the electrical actuators from an initial operating level to a standby level, that is not zero with the flow of electrical current at the initial operating level being related to hydraulic actuating pressures being directed to the shifting elements (A to E) in an initial operating state;
  when a request for starting the engine is made by the engine start/stop function, adjusting the flow of electrical current to the electrical actuators from the standby level to a subsequent operating level;
  when the engine is shut down, reducing the hydraulic actuating pressures directed to the shifting elements (A to E) to zero;
  setting the flow of electrical current to the electrical actuators at the standby level lower than the flow of electrical current to the electrical actuators at the initial operating level; and
  providing the flow of electrical current to the electrical actuators at the standby level, when the request for shutting down the engine (2) is made by the engine start/stop function, corresponds with the flow of electrical current to the electrical actuators at the subsequent operating level,
  carrying out the adjustment of the flow of electrical current to the electric actuators (7, 8), at which the transmission mechanism (3) is changed from a startup gear transmission ratio to a target gear transmission ratio on an actuator side, during normal driving of a vehicle (1) by way of a provided shift process when there is a request for startup of the internal combustion engine (2),
  shifting the gear ratios, via the shift process, at least on the actuator side in the transmission mechanism (3).

* * * * *